(12) United States Patent
Duffett-Smith et al.

(10) Patent No.: US 7,315,745 B2
(45) Date of Patent: Jan. 1, 2008

(54) RADIO POSITIONING SYSTEMS

(75) Inventors: Peter James Duffett-Smith, Cambridge (GB); Malcolm David MacNaughtan, Sydney (AU); Christopher John Clarke, Cambridge (GB); Robert Willem Rowe, Cambridge (GB)

(73) Assignee: Cambridge Positioning Systems Ltd., Cambridge (GB)

(*) Notice: Subject to any disclaimer, the term of this patent is extended or adjusted under 35 U.S.C. 154(b) by 56 days.

(21) Appl. No.: 10/525,829

(22) PCT Filed: Aug. 18, 2003

(86) PCT No.: PCT/GB03/03604

§ 371 (c)(1),
(2), (4) Date: Feb. 25, 2005

(87) PCT Pub. No.: WO2004/021033

PCT Pub. Date: Mar. 11, 2004

(65) Prior Publication Data

US 2005/0259763 A1   Nov. 24, 2005

(30) Foreign Application Priority Data

Aug. 28, 2002  (EP) .................. 02255960

(51) Int. Cl.
*H04Q 7/20* (2006.01)
(52) U.S. Cl. ................. 455/456.1; 455/67.11
(58) Field of Classification Search ......... 455/67.11, 455/456.1, 500, 502, 456.6; 342/357.09, 342/357.1
See application file for complete search history.

(56) References Cited

U.S. PATENT DOCUMENTS

| | | | | |
|---|---|---|---|---|
| 5,883,598 A | * | 3/1999 | Parl et al. ............... 342/457 |
| 5,945,948 A | * | 8/1999 | Buford et al. ............. 342/457 |
| 6,047,017 A | * | 4/2000 | Cahn et al. ................ 375/148 |
| 6,094,168 A | * | 7/2000 | Duffett-Smith et al. ..... 342/463 |
| 6,275,705 B1 | * | 8/2001 | Drane et al. ............. 455/456.2 |
| 6,342,854 B1 | * | 1/2002 | Duffett-Smith et al. ..... 342/457 |
| 6,445,928 B1 | * | 9/2002 | Ruutu et al. ................ 455/502 |
| 6,459,402 B1 | * | 10/2002 | Tsunehara et al. ............ 342/47 |
| 6,484,034 B1 | * | 11/2002 | Tsunehara et al. ........ 455/456.6 |
| 6,529,165 B1 | * | 3/2003 | Duffett-Smith et al. ..... 342/463 |
| 6,657,579 B2 | * | 12/2003 | Tsunehara et al. ............ 342/47 |
| 6,671,514 B1 | * | 12/2003 | Cedervall et al. ........ 455/456.1 |
| 6,701,132 B1 | * | 3/2004 | Fukuzawa et al. ....... 455/67.16 |
| 6,788,251 B2 | * | 9/2004 | Townsend et al. .......... 342/384 |
| 6,889,051 B2 | * | 5/2005 | Ogino et al. ............. 455/456.1 |
| 6,894,644 B2 | * | 5/2005 | Duffett-Smith et al. ..... 342/387 |
| 6,900,753 B2 | * | 5/2005 | Tsunehara et al. ............ 342/47 |
| 6,917,644 B2 | * | 7/2005 | Cahn et al. ................ 375/142 |
| 6,937,866 B2 | * | 8/2005 | Duffett-Smith et al. .. 455/456.1 |
| 7,006,838 B2 | * | 2/2006 | Diener et al. ............. 455/456.1 |
| 2002/0115448 A1 | * | 8/2002 | Amerga et al. ............. 455/456 |
| 2002/0149518 A1 | * | 10/2002 | Haataja et al. .............. 342/458 |
| 2002/0160788 A1 | * | 10/2002 | Duffett-Smith et al. ..... 455/456 |
| 2003/0045303 A1 | * | 3/2003 | Oda et al. .................. 455/456 |
| 2003/0050079 A1 | * | 3/2003 | Tsunehara et al. .......... 455/456 |
| 2003/0064733 A1 | * | 4/2003 | Okanoue et al. ........... 455/456 |
| 2003/0146871 A1 | * | 8/2003 | Karr et al. ................. 342/457 |
| 2004/0196186 A1 | * | 10/2004 | Duffett-Smith et al. ..... 342/464 |
| 2005/0200525 A1 | * | 9/2005 | Duffett-Smith et al. ..... 342/464 |

FOREIGN PATENT DOCUMENTS

WO   01/65271   9/2001

OTHER PUBLICATIONS

Suzuki H. et al.: "An Orthogonal Successive Interference Canceller for the Downlink Communications in a DS-CDMA Mobile System", GLOBECOM '00, 2000 IEEE Global Telecommunications Conference, San Francisco, CA, Nov. 27-Dec. 1, 2000, IEEE Global Telecommunications Conference, New York, NY: IEEE, US, vol. 2 of 4, Nov. 27, 2000, pp. 847-851.

* cited by examiner

*Primary Examiner*—Lana Le
*Assistant Examiner*—April S. Guzman
(74) *Attorney, Agent, or Firm*—Roylance, Abrams, Berdo & Goodman, L.L.P.

(57) ABSTRACT

The invention provides a method of estimating the time offsets between signals transmitted by plural transmitters of a communications network and received by a receiver attached to a terminal. In the method a section of a representation of the signals from the plural transmitters received by the receiver at the terminal (a "terminal section") is created as are a first section of a representation of the signal transmitted by a first of said transmitters and a second section of a representation of the signal transmitted by a second of said transmitters. Each of the first and second sections overlaps in time with the terminal section. Using the first section, the second section and a set of signal parameters, including initial estimates of the time offsets between the first section and the terminal section and between the second section and the terminal section, a model of a section of a representation of the composite signal received by the receiver from the first and second transmitters is created. Thereafter, the model is compared with the terminal section and the set of signal parameters including the time offset estimates is refined to minimize the difference between the model and the terminal section. The time offsets in the refined parameter set used to minimize the difference between said model and the terminal section, are adopted as the estimated time offsets between the first section and the terminal section and between the second section and the terminal section.

21 Claims, 7 Drawing Sheets

RADIO POSITIONING SYSTEMS

The present invention relates to radio positioning systems generally, and more particularly to improved methods of finding the positions of mobile terminals in radio communication systems, especially those employing Code Division Multiple Access (CDMA) technology.

There are many systems known by which the position of a mobile terminal operating in a radio communications network may be determined. These include using the signals from transmitters not connected with the network, such as the Global Positioning System (GPS) satellites, but others make use of the signals radiated by the mobile terminal and picked up by remote receivers, such as the Time Of Arrival (TOA) and so-called "Radio Finger Printing" systems or, vice versa, using the signals radiated by the network itself and picked up by the mobile terminal. Chief amongst the last category are the Enhanced Observed Time Difference (E-OTD) and Observed Time Difference Of Arrival (OT-DOA) systems.

The E-OTD system, although generally applicable to many different communication technologies, has been particularly applied to the Global System for Mobiles (GSM). Two principal, and different, methods of using the timing offsets of signals received from the network transmitters in the position computation have been described in the art. In one, e.g. EP-A-0767594, WO-A-9730360, U.S. Pat. No. 6,108,553 and AU-B-716647, the signals measured by a fixed receiver are used, in effect, to 'synchronise' the transmissions from the different transmitters. The instantaneous transmission time offsets of each transmitter relative to its neighbours are calculated from the values measured at the fixed receiver using the known positions of the fixed receiver and the transmitters. The timing offsets measured by the mobile terminal can then be used in a calculation based on well-known standard techniques in which the points of intersection of two or more hyperbolic position lines predict the position of the mobile terminal.

The other method (see both our EP-B-0303371, WO-A-8901637, U.S. Pat. No. 6,094,168 and EP-A-1025453, WO-A-9921028 the details of which are hereby incorporated by reference and which refer to a system known as Cursor®) makes use of the measurements made by both the fixed receiver and the mobile terminal to calculate the relative time difference between the signals received from each transmitter by both receivers. This results in a calculation based on the intersection of circles centred on the transmitters.

E-OTD methods, as applied to GSM, have been considered for use in wide-band CDMA systems, in particular those within the Universal Mobile Telephone System (UMTS) 'third generation' (3G) technologies. Here, E-OTD has been re-named OTDOA, but it suffers from a major problem, the so-called 'hearability' problem. In CDMA networks generally, signals are transmitted by the network transmitters all using the same radio-frequency (RF) channel. In UMTS this channel is about 5 MHz wide. The signals from each transmitter are encoded using a unique 'spreading code' which allows a mobile terminal to pick out the required signal provided that (a) it knows the spreading code used by that transmitter, and (b) its internal clock is synchronized with the transmitter signals. To assist with the latter, each transmitter also radiates a 'pilot code' within the same RF channel whose coding and other characteristics make it easily distinguishable. The mobile terminal first detects and locks on to the pilot signal, receives the spreading code used by that transmitter, and then is able to decode the main transmissions. The hearability problem arises when the mobile terminal is near to a transmitter. E-OTD systems (and therefore OTDOA systems) require the measurements of the time offsets associated with at least three geographically-distinct transmitters, but when the mobile terminal is too close to a transmitter, the signals from the more-distant transmitters are drowned out by the local signals to the extent that their time offsets cannot be measured. One technique, known as 'Idle Period on the Down Link' (IP-DL), has been proposed to overcome this problem by which the transmissions from the local transmitter are turned off periodically in a so-called 'idle period' during which the signals from the distant transmitters may be received. This has the serious disadvantages that (a) the capacity of the network to carry voice & data traffic is diminished, and (b) it is complicated to install and operate, requiring in one of its forms additional messaging in the network to coordinate the idle periods amongst the transmitters.

An alternative method of countering the hearability problem is described in European patent application number 01306115.5, which provides details of an adaptation of the Cursor® system, especially as described in our U.S. Pat. No. 6,094,168, to CDMA systems in general and particularly to UMTS in such a fashion as to overcome the hearability problem. No idle period is required, and the communications function can therefore operate with full capacity.

Another prior art method, as described in XP-001017205, employs cancellation of a cross-correlation peak in the output from a matched filter bank, using a cross-correlation profile derived from an estimate of the channel impulse response. In contrast to the current inventive method, Suzuki's method does not take into account the signals as transmitted, but only as received. In addition, cancelling after correlation suffers from the problem of limited dynamic range in coarsely-sampled systems, causing inaccurate correlation shapes, and errors in the estimate appear as noise in the total correlation output.

U.S. Pat. No. 6,047,017 describes how a simple estimate of the radio channel can be modelled using weights in a finite impulse response filter. An internally-generated signal based on a particular value of the code phase is passed through this filter and the output is subtracted from the incoming signal to produce an error signal. This error signal is then used to modify the code phase to drive the error towards zero, hence reducing the radio channel effects on code position. In contrast to our method, the simple radio channel model weights are not varied to improve the cancellation, and no account is taken of the transmitted signal.

The Cursor® system, as described in U.S. Pat. No. 6,094,168, uses two receivers, one fixed and at a known location and the other within the mobile terminal, to receive the signals radiated by each transmitter taken separately. Representations of the received signals are sent back to a computing node where they are compared (generally by cross-correlation) to determine the time offset of receipt of the signals by each receiver. This process is repeated for at least two other geographically-distinct transmitters (transmitting on different RF channels in a GSM system) to obtain the three time offsets required for a successful position computation.

In direct sequence CDMA systems the transmitters use the same RF channel. A direct application of the Cursor® system to CDMA would therefore result in a cross-correlation with many peaks, each corresponding to the alignment of the signals received from a particular one of the transmitters by both receivers. If it were possible to measure the peaks associated with at least the three required transmitters, the system would serve for positioning. However, as illustrated below, the signal to noise ratios (SNRs) associated with more-distant transmitters are often too small, and we have a similar hearability problem as described above.

The following mathematical analysis provides an understanding of the prior art method of countering hearability as described in EP application no. 01306115.5. FIG. 1 shows the geometry of a two-dimensional system in which all the transmitters and the mobile terminal lie in one plane. The positions of transmitters A, B, and C are represented by the vectors a, b, c, all with respect to the same common origin, O. The mobile terminal, R, is at vector position x. Each of the transmitters has incorporated with it a sampling device which samples the signals transmitted by that transmitter and which sends back to a computing device (not shown in FIG. 1) a representation thereof. For simplicity, we make the assumption that the transmitters are synchronized with each other, so that their relative transmission time offsets are known and equal to zero. It is described elsewhere in e.g. U.S. Pat. No. 6,094,168 how the relative transmission time offsets can be measured in unsynchronized networks. Let us suppose that the mobile terminal is nearest to transmitter A, then B, then C. The computing device first performs a cross-correlation between the representation of the signals received (all on the same RF channel) from A, B, and C by R, and the representation of the signals transmitted by A. Since the signals from A, B, and C are uncorrelated with each other, the cross-correlation results in a single peak whose position represents the time-offset of the receipt of the signals from A by R, together with the clock error, $\epsilon$, of the receiver in the mobile terminal. This time offset, $\Delta t_A$, is given by $$v\Delta t_A = |x-a| + \epsilon,$$

where v is the speed of the radio waves, and the vertical bars denote the magnitude of the contained vector quantity. Similarly, for B and C we have $$v\Delta t_B = |x-b| + \epsilon,$$

$$v\Delta t_C = |x-c| + \epsilon. \quad \{1\}$$

Having established the time offset of the signals from A, the computing node now subtracts an estimate of the signal received from A by R. The representations of the signals radiated at time t by the transmitters A, B, and C, may be denoted by $S_A(t)$, $S_B(t)$, and $S_C(t)$ respectively. The signal received by the mobile terminal comprises a combination of these. In the absence of multipath, noise and non-linear effects, the representation of the received signals may be denoted by r(t), where $$r(t) = \alpha S_A(t-\Delta t_A) + \beta S_B(t-\Delta t_B) + \gamma S_C(t-\Delta t_c), \quad \{2\}$$

and $\alpha$, $\beta$, $\gamma$ are complex constants representing the amplitudes and phases of the signals from the respective transmitters. A software program running in the computing node estimates the magnitude of $S_A(t)$, delayed by $\Delta t_A$, to subtract from r(t), for example by finding the value of $\alpha$ which minimises the mean square amplitude of the residual r'(t). In the perfect case this would remove the contribution of A altogether, so that $$r'(t) = \beta S_B(t-\Delta t_B) + \gamma S_C(t-\Delta t_C).$$

The cross-correlation is now carried out between r'(t) and $S_B(t)$ to estimate $\Delta t_B$, and a further subtraction made to remove the contribution of B from the residual, r''(t), where $$r''(t) = \gamma S_C(t-\Delta t_C),$$

if the subtraction is perfect. Finally, a cross-correlation between r''(t) and $S_C(t)$ results in an estimate of $\Delta t_C$. Equations $\{1\}$ can then be solved for x as described in U.S. Pat. No. 6,094,168.

In practice, the signals received by the mobile terminal are corrupted by noise, interference and multipath effects. Furthermore, the representations of the signals may be in a digital format of low resolution. The process of subtraction will not be perfect in these circumstances, but may nevertheless be sufficient to overcome the hearability problem. An example of a prior art system (as proposed in EP application no. 01306115.5) wherein the subtraction is sufficient to overcome the hearability problem will now be described with reference to FIGS. 2 to 7. It is necessary to appreciate fully the prior art in order to understand the advance of the present invention FIG. 2 shows a simplified UMTS system consisting of three communications transmitters (Node Bs) 201, 202, 203, each of which has a sampling device 204, 205, 206, a single terminal (user equipment, UE) 207, and a computing device (serving mobile location centre, SMLC) 208. Each Node B has an omni-directional antenna, and is configured to transmit signals typical of network traffic load. Table 1 below indicates the different physical channels in use, together with their power levels and symbol rates. The acronyms-appearing in the left-hand column, P-CPICH etc., are those that have been adopted by the industry to represent the channels. Random binary sequences are used to modulate the DPCHs. The three Node Bs use different 'Gold' primary scrambling codes, in this case numbers 0, 16 and 32 respectively (as designated in 3G TS 25.213, section 5.2.2).

TABLE 1

Node B channel configuration

| Channel | Relative power Level/dB | Symbol rate/Kss$^{-1}$ |
|---|---|---|
| P-CPICH | −10 | 15 |
| P-SCH | −10 | 15 |
| S-SCH | −10 | 15 |
| P-CCPCH | −10 | 15 |
| PICH | −15 | 15 |
| DPCH0 | Note 1 | Note 2 |
| DPCH1 | Note 1 | Note 2 |
| DPCH2 | Note 1 | Note 2 |
| ... | Note 1 | Note 2 |
| ... | Note 1 | Note 2 |
| DPCH63 | Note 1 | Note 2 |
| DPCH64 | Note 1 | Note 2 |

Note 1:
DPCH power levels were chosen randomly from −10 dB to −25 dB
Note 2:
DPCH symbol rates were chosen randomly from 15 to 240 Kss$^{-1}$ The Node Bs here are tightly synchronised. As already noted above, this is not a requirement in normal practice, but is convenient for the purpose of demonstration.

It will be noted from FIG. 2 that the UE 207 is relatively close to Node B 201 and at greater distances from Node Bs 202 and 203. Thus the signal from Node B 201 is the strongest (0 dB relative to itself) with the signal from Node B 202 weaker at −15 dB and that from Node B 203 weakest of all at −30 dB. The three sampling devices 204, 205, 206 are instructed by the SMLC 208 to record and report the signal transmitted by the associated Node B during the first 256 chips immediately following the start of the next second. These signals are sampled at a rate of 2 samples per chip, with a resolution of 4 bits.

The problem of hearability is highlighted by considering the conventional E-OTD or OTDOA approach to measuring the time offsets of the signals received by the UE 207. A reference copy of the primary scrambling code used on the CPICH by each Node B (i.e. the first 256 chips of each of scrambling codes 0, 16 and 32), is cross-correlated with the signal received by the UE 207 and a search is made for the highest correlation peak. FIG. 3 illustrates a typical result. Note that the signals received by the UE 207 are also sampled at a rate of 2 samples per chip, with a resolution of 4 bits. The resulting cross-correlation profiles show one clearly distinguishable peak 301 in the correlation for scrambling code 0, corresponding to the time offset of the signals from Node B 201. However, the cross-correlation results for the codes 16 and 32 do not yield any clear peaks. This is because the signals received by the UE 207 from Node Bs 202 and 203 are swamped by the relatively strong reception from Node B 201. Were they visible, these peaks should be positioned to the right of the visible peak 301 by 1 and 2 microseconds respectively for the signals from Node Bs 202 and 203 (corresponding to 3.8 and 7.6 chips). The lack of detection of the signals from 202 and 203 means that it is not possible to compute an E-OTD or OTDOA position fix, since at least three independent timings are needed.

The prior art method described in EP 01306115.5 is now illustrated using the same test system. In this case, each sampling device 204, 205, 206 records a section of the signals transmitted by its associated Node B 201, 202, 203 respectively. This section is one symbol in duration and is again sampled at a rate of 2 samples per chip, with a resolution of 4 bits. The UE 207 also records a 256-chip section of the signals it receives, aligned with the first symbol on the CPICH in a particular timeslot, at the same sampling rate and resolution.

At the SMLC 208, the three recordings reported by the three sampling devices 204, 205, 206 are each cross-correlated in turn with the recording made by the UE 207, and the results are shown in FIG. 4. The peaks of the resulting correlation profiles are used to determine the relative levels of the three contributions in the received signal and hence the order in which they are to be subtracted. Once again, the cross-correlation for Node B 201 yields the largest peak 401. Note also that, in contrast with FIG. 3, the cross-correlation for Node B 202 also yields a clear peak 402. This is because the cross-correlation is performed using the total signal transmitted by the Node Bs rather than merely using the CPICH, which represents a fraction of the total transmitted energy in each case.

Having identified the time offset of the signal from Node B 201, the recording of the signal reported by the sampling device 204 is now used to construct an appropriately scaled, delayed and phase-rotated copy of that signal. The results of this process are plotted in FIG. 5. The upper plot shows the real component of the original signal recorded by the UE 207 as a solid curve whilst the dotted curve shows the estimated scaled, delayed and rotated signal. The lower plot shows a similar comparison of the imaginary parts of received and estimated signals. Note that whilst a duration of 256 chips is actually used in the example, the time axis in this Figure has been limited to about 50 chips. The estimated recordings are subtracted from the total UE recording leaving a residual recording.

The recordings from the sampling devices 205 and 206 are now cross-correlated with the residual recording giving the results shown in FIG. 6. Note that in this case, following the removal of the signal from Node B 201, there is a clear correlation peak 601 for the signals from Node B 203 as well as a peak 602 for Node B 202. These peaks are used to estimate the time offsets of the corresponding signals, giving sufficient independent timing measurements (three in this case) to compute a position fix.

If the peak 601 corresponding to the signals from Node B 203 were too weak to be resolved, a further iteration could be undertaken in which the signals from Node B 202 could be subtracted to yield a second residual signal (FIG. 7). There is a clear correlation peak 701 at a delay of approximately 7 chips as expected.

In the prior art method of EP 01306115.5 discussed above, an estimate of the signal received from one transmitter is created by scaling and delaying the representation of the signal transmitted by the one transmitter and this estimate is subtracted from the representation of all of the signals received by the mobile terminal to give a residual representation. The residual representation is then analysed for the time delays of the contributions from other transmitters, which may require the estimation of the signal received from another transmitter (by scaling and delaying the signal representation transmitted by the other transmitter).

In order to carry out this method, it is desired to estimate the scaling factors and time offsets as accurately as possible.

The invention therefore provides a method of estimating the time offsets between signals transmitted by plural transmitters of a communications network and received by a receiver attached to a terminal, the method comprising the steps of (a) creating a section of a representation of the signals from the plural transmitters received by the receiver at the terminal (a "terminal section");

(b) creating a first section of a representation of the signal transmitted by a first of said transmitters, and creating a second section of a representation of the signal transmitted by a second of said transmitters, each of which sections overlaps in time with the terminal section;

(c) using the first section, the second section and a set of signal parameters, including initial estimates of the time offsets between the first section and the terminal section and between the second section and the terminal section, to create a model of a section of a representation of the composite signal received by the receiver from the first and second transmitters;

(d) comparing the model with the terminal section;

(e) refining the set of signal parameters including the time offset estimates to minimise the difference between said model and the terminal section; and (f) adopting the time offsets in the refined parameter set used to minimise the difference between said model and the terminal section, as the estimated time offsets between the first section and the terminal section and between the second section and the terminal section.

A calculation of the position of the terminal may be made using the time offset estimates. A mobile terminal moving in a communications network may be tracked by periodically estimating the time offsets.

This method provides an optimal and consistent method of estimating the scaling factors and time offsets of the signals received from plural transmitters by a minimisation technique in which the minimum can be found quickly and simultaneously of the difference between a model created by applying scaling factors and time delays to plural representations of the signals transmitted, and the representation of all of the signals received by the mobile terminal. This is achieved by applying the best-fitting scaling factors and time delay values. The present invention thus enables a method of simultaneously finding the time offsets between signals transmitted by plural transmitters and received by a receiver attached to a terminal.

There are several algorithms known in the art by which a set of parameters of a model of a given signal or set of signals (parameters including, for example, the amplitude, time offset, phase difference etc.) can be refined in such a way as to reduce the difference between the current signal model (based on an initial set of parameters) and the given (target) signal or set of signals. In general, the target signal is in the form of a series of samples which are regularly spaced in time, and it is necessary therefore also to generate the model at the same sample times.

The first section, the second section, and the terminal section may be created by sampling the respective signals at sample times according to a predetermined sampling rate.

In a preferred method, at least the first section, scaled by a first initial complex amplitude value and delayed by a first initial time delay, and the second section, scaled by a second initial complex amplitude value and delayed by a second initial time delay, are used to build an adjustable representation (model) of the combined signal from the first and second transmitters received by the receiver. This model may be subtracted from the terminal section to produce a time series containing the complex difference at each sample time. The squares of the amplitudes of the complex difference at each sample time may be added to produce a single real value representative of the overall difference between the initial model and the target signal or set of signals. The aim of the procedure is to reduce this single value to a minimum.

The model may comprise three, four or more scaled and delayed transmitter sections.

Preferably, the first and second sections are created at the respective first and second transmitters, but they may be created elsewhere. They may be created in one or more sampling devices attached to the respective transmitters or located elsewhere, or they may be created by computer programs running anywhere in the communications network, or elsewhere, using information supplied from the network about the transmitted signals The various signal representation sections may be sent to one or more computing devices in which said estimates and preferably the terminal location, may be calculated. The one or more computing devices may be in the terminal, in another terminal and/or elsewhere, for example, a processor connected to the network.

The section of the representation of the signals received by the receiver at the terminal may be recorded in the terminal before being sent to a computing device. Alternatively, the section may be transferred in real time to the computing device and a recording made there.

Preferably, the section of the representation of the signals transmitted by a transmitter is created at that transmitter, but it may be created elsewhere. It may be created in a sampling device attached to the transmitter or located elsewhere, or it may be created by a computer program running anywhere in the communications network, or elsewhere, using information supplied from the network about the transmitted signals. The terminal may be a part of a positioning system, for example as described in any of EP-A-0767594, WO-A-9730360, AU-B-716647 EP-B-0303371, U.S. Pat. No. 6,094,168 and EP-A-1025453 and may be a fixed device associated with a transmitter (for example, the 'fixed receiver' or 'Location Measurement Unit, LMU'), whose purpose is to receive signals from distant transmitters as well as from its associated transmitter.

The representation of the signals received by the receiver attached to the terminal may be a digitised version of the received signals converted first to baseband in the receiver. The representation of the signals transmitted by a transmitter may be a digitised version of the transmitted signals converted first to baseband.

In order to ensure an overlap of the respective sections, a suitably chosen component of the transmitted signals may be used to indicate the start of sampling.

The invention also includes apparatus including a processing means arranged to carry out the method of the invention described above.

In a further aspect, the invention includes apparatus for estimating the time offsets between signals transmitted by plural transmitters of a communications network and received by a receiver attached to a terminal, comprises (a) processing means arranged to create a section of a representation of the signals from the plural transmitters received by the receiver at the terminal (a "terminal section");

(b) processing means arranged to create a first section of a representation of the signal transmitted by a first of said transmitters, and to create a second section of a representation of the signal transmitted by a second of said transmitters, each of which sections overlaps in time with the terminal section;

(c) processing means arranged to create a model of a section of a representation of the composite signal received by the receiver from the first and second transmitters using the first section, the second section and a set of signal parameters, including initial estimates of the time offsets between the first section and the terminal section and between the second section and the terminal section;

(d) processing means arranged to compare the model with the terminal section;

(e) processing means arranged to refine the set of signal parameters including the time offset estimates to minimise the difference between said model and the terminal section; and (f) processing means arranged to adopt the time offsets in the refined parameter set used to minimise the difference between said model and the terminal section, as the estimated time offsets between the first section and the terminal section and between the second section and the terminal section.

In some cases it may be desirable for the time offsets to be calculated in a terminal of a communications system and thus the invention includes a telecommunications terminal including apparatus for finding the time offsets between signals transmitted by a plurality of transmitters of a communications network and received by a receiver attached to the terminal, the apparatus comprising a. processing means arranged to create a section of a representation of the signals from plural transmitters received by the receiver at the terminal (a "terminal section");

b. processing means for receiving a first section of a representation of the signal transmitted by a first of said transmitters and a second section of a representation of the signal transmitted by a second of said transmitters, each of which sections overlaps in time with the terminal section;

c. processing means arranged to create a model of a section of a representation of the composite signal received by the receiver from the first and second transmitters using the first section, the second section and a set of signal parameters, including initial estimates of the time offsets between the first section and the terminal section and between the second section and the terminal section;

d. processing means arranged to compare the model with the terminal section;

e. processing means arranged to refine the set of signal parameters including the time offset estimates to minimise the difference between said model and the terminal section; and f. processing means arranged to adopt the time offsets in the refined parameter set used to minimise the difference between said model and the terminal section, as the estimated time offsets between the first section and the terminal section and between the second section and the terminal section.

The invention also includes a communications network for finding the time offsets between signals transmitted by a plurality of transmitters of the communications network and received by a receiver attached to a terminal, the network comprising (a) a computing device or devices;

(b) a terminal having a receiver attached to the terminal, processing means arranged to create a section of a representation of the signals from plural transmitters received by the receiver at the terminal (a "terminal section"), and means for sending the section to the computing device or devices;

(c) sampling devices associated with respective first and second ones of said transmitters for creating respective first and second sections of representations of the signals transmitted by a first and a second of said transmitters, each of which sections overlaps in time with the terminal section, and for sending the sections of representations to the computing device or devices;

the computing device or devices being adapted to create a model of a section of a representation of the composite signal received by the receiver from the first and second transmitters using the first section, the second section and a set of signal parameters, including initial estimates of the time offsets between the first section and the terminal section and between the second section and the terminal section;

compare the model with the terminal section;

refine the set of signal parameters including the time offset estimates to minimise the difference between said model and the terminal section; and adopt the time offsets in the refined parameter set, used to minimise the difference between said model and the terminal section, as the estimated time offsets between the first section and the terminal section and between the second section and the terminal section.

The invention also includes a computing device or devices for use in a communications network, the computing device being adapted to create a model of a section of a representation of the composite signal received by the receiver from the first and second transmitters using the first section, the second section and a set of signal parameters, including initial estimates of the time offsets between the first section and the terminal section and between the second section and the terminal section;

compare the model with the terminal section;

refine the set of signal parameters including the time offset estimates to minimise the difference between said model and the terminal section; and adopt the time offsets in the refined parameter set, used to minimise the difference between said model and the terminal section, as the estimated time offsets between the first section and the terminal section and between the second section and the terminal section.

Within the scope of the invention is a computer program or programs comprising computer program code means embodied on a computer-readable medium adapted to perform the steps of the computing device or devices defined above.

The E-OTD positioning systems described generally above work with unsynchronised networks, i.e. any common component of the signals transmitted by any one transmitter is not synchronised in time with the transmission of that component by any other of the transmitters, but instead is transmitted after an unknown time delay, sometimes called the Relative Transmission Delay (RTD). The position calculation may require that this delay is known, and so the positioning systems employ fixed receivers at known locations throughout the network that are set up to measure the transmitted signals and compute the RTDs. It has been described above how the hearability problem hinders the straightforward application of the E-OTD techniques to direct-sequence CDMA systems. However, the present invention overcomes the hearability problem by allowing the time offsets of plural signals to be estimated simultaneously, even though the signals from one transmitter may be dominant. The terminal section comprises the sum of all the contributions received from all of the transmitters, and although a given contribution may be small compared to others, its influence may nevertheless be detected by a suitably sensitive technique such as that described here. The method of application of E-OTD to CDMA systems then follows that described, for example, in our EP-A-1025453.

The invention also includes one or more computing devices in which the calculations described herein above are made. The means for carrying out the calculations in the computing device or devices may be components of hardware and/or software and therefore, the invention also includes a computer program or programs having computer program code means for carrying out the steps performed in the computing device or devices as described above.

The invention may be further understood by reference to the accompanying drawings, in which.

The same apparatus as described above in relation to EP01306115.5, when suitably programmed, can be used for the purposes of the present invention.

The following mathematical analysis provides an understanding of the concepts involved in the present application.

Figure 2:
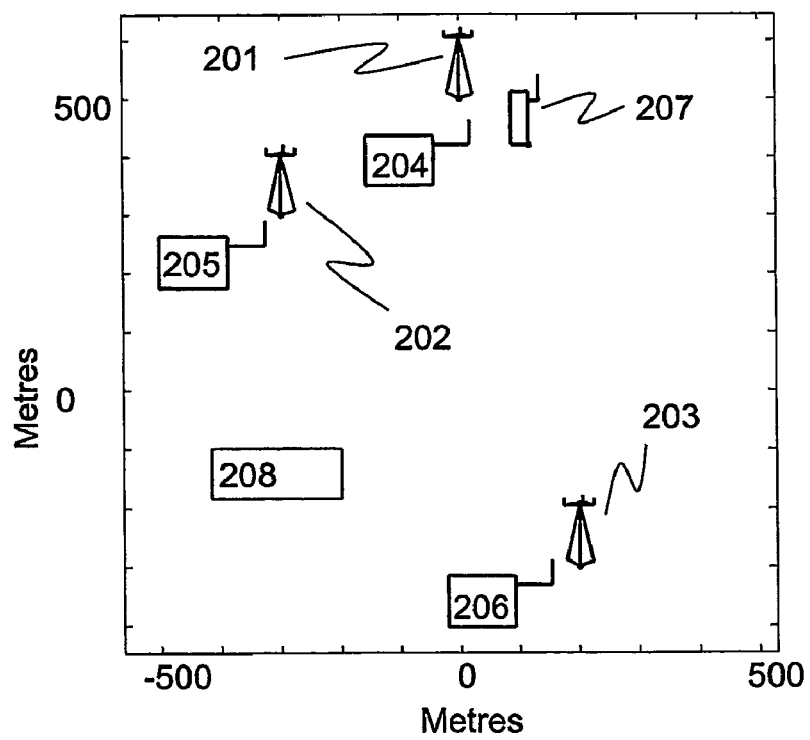
FIG. 2 shows a simplified UMTS network.
Figure 3:
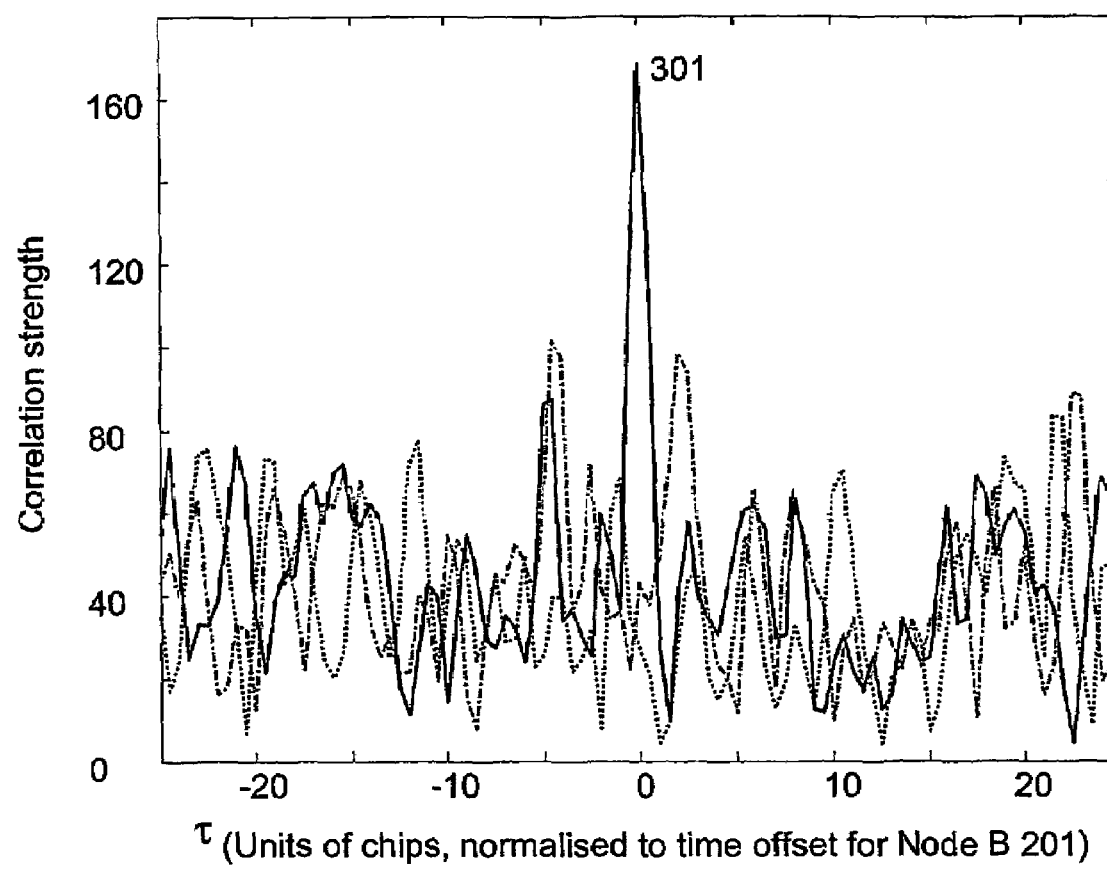
FIG. 3 illustrates the correlation of a reference copy of the primary scrambling code used on the pilot code channel (CPICH) by each Node B of the UMTS network with a recording of the received signal.
Figure 4:
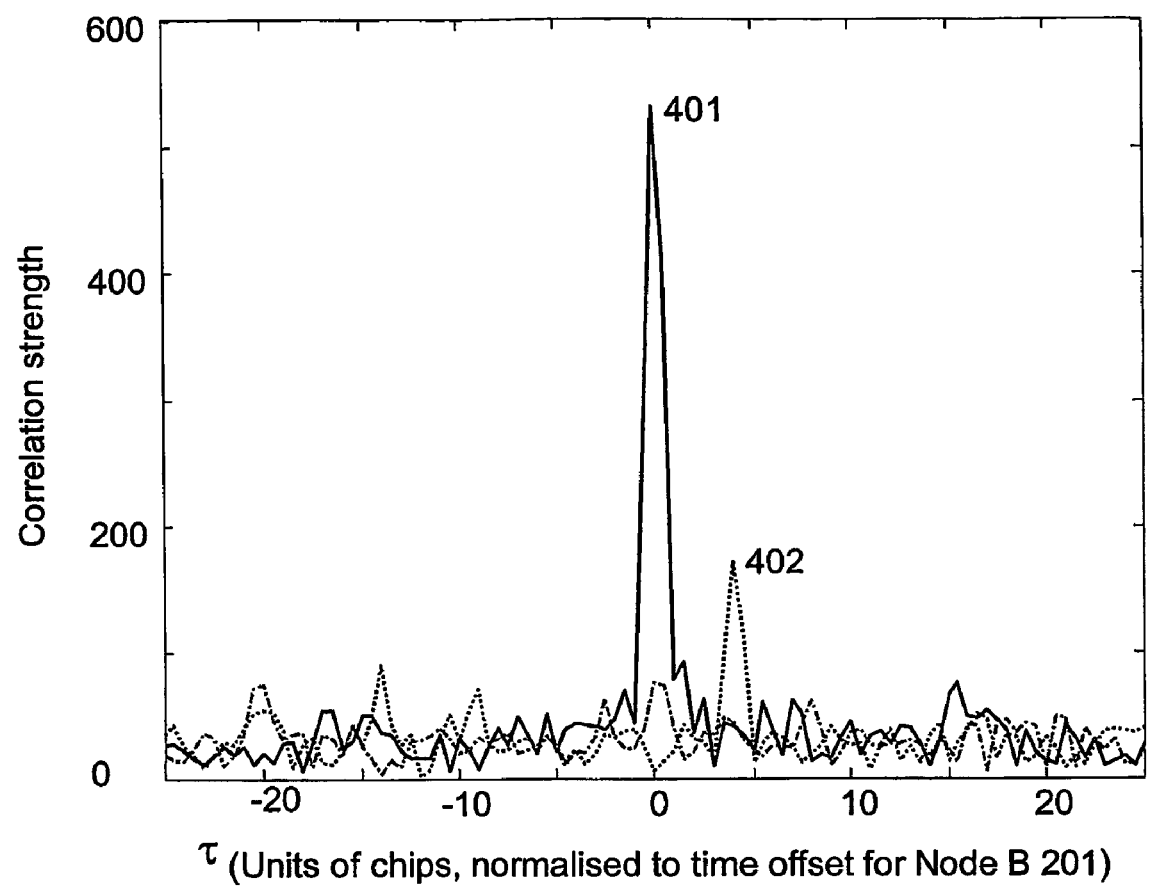
FIG. 4 shows the result of cross-correlating the recording received by a terminal with recordings of the transmitted signals.
Figure 5:
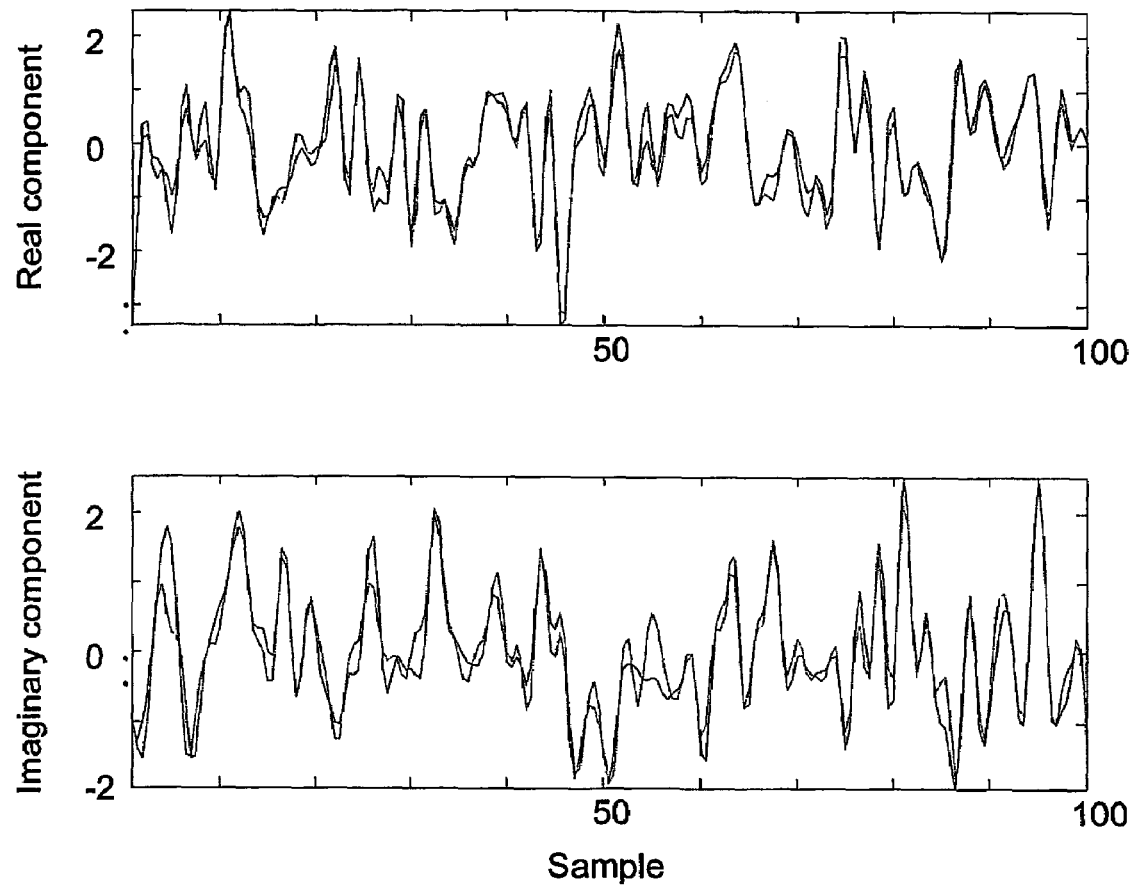
FIG. 5 illustrates measured and estimated recordings.
Figure 6:
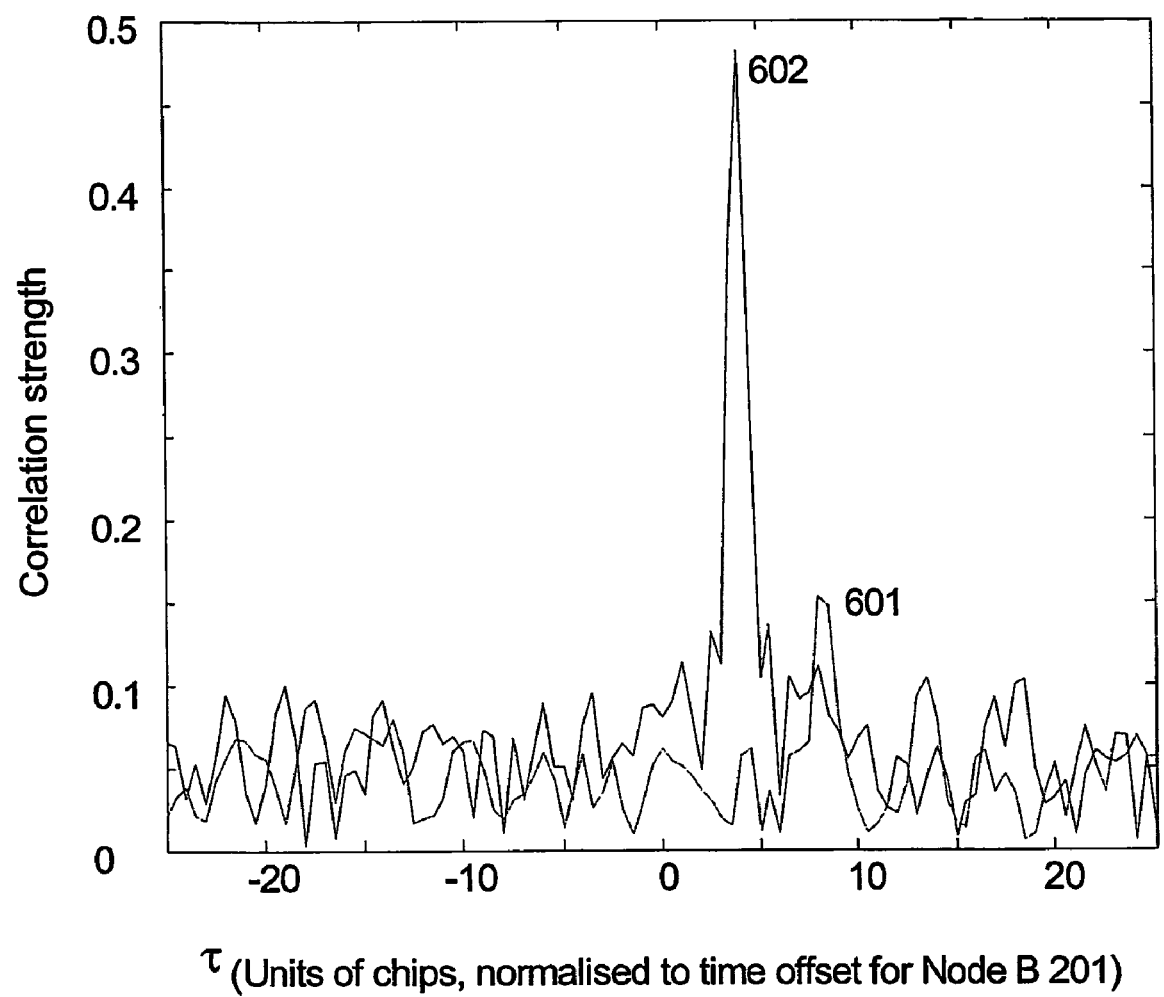
FIG. 6 shows the cross-correlation of a residual recording with recordings of transmitted signals.
Figure 7:
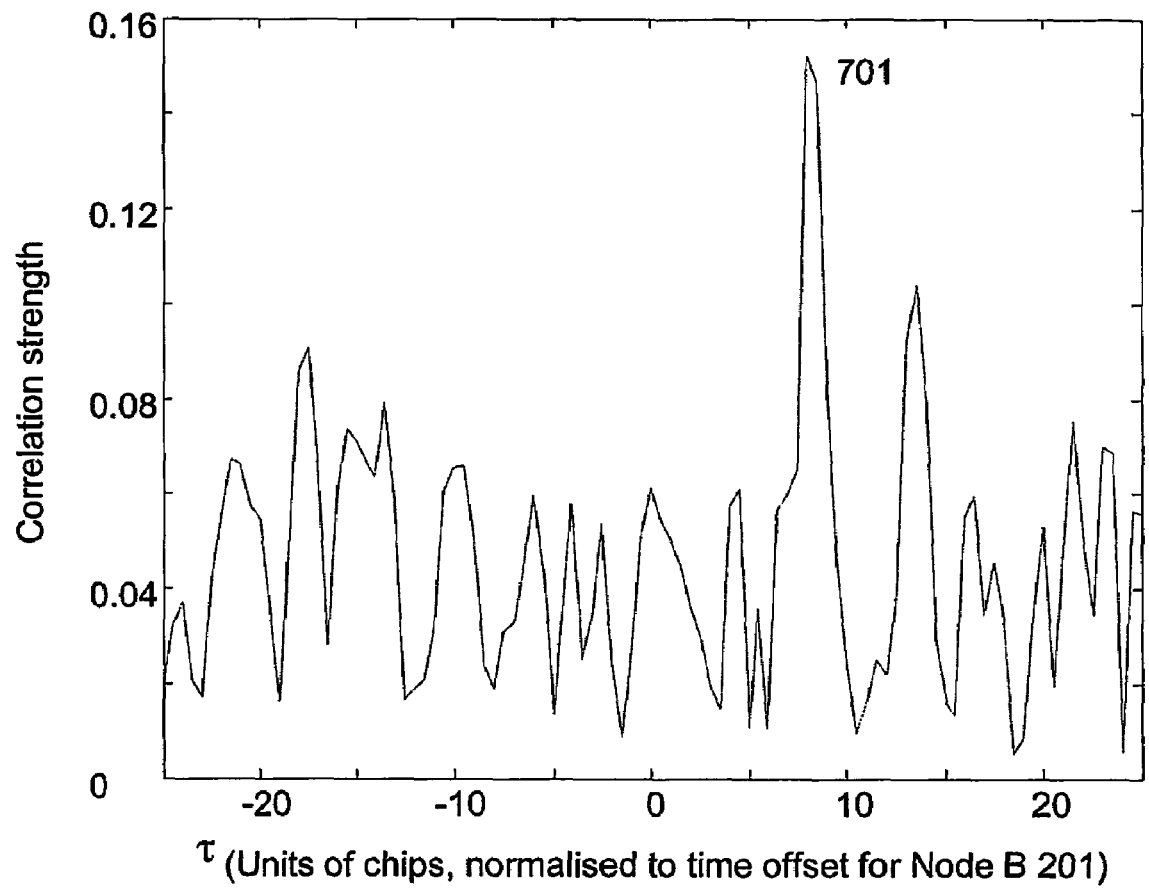
FIG. 7 shows the cross-correlation of a further residual recording with a recording of a transmitted signal.
Figure 8:
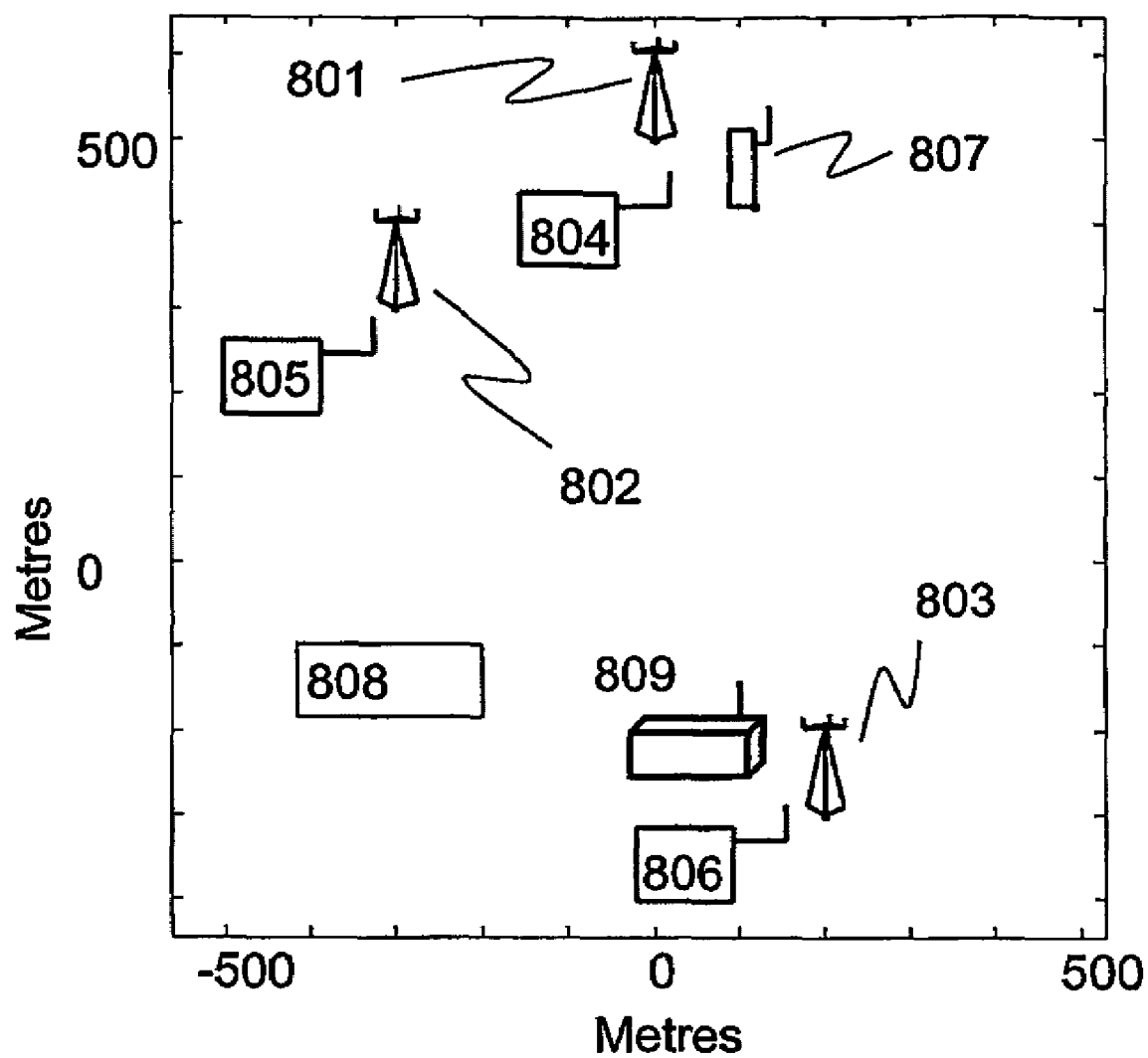
FIG. 8 shows a simplified UMTS network having a fixed receiver.

The process of determining the time offsets of the three signals received by the terminal depicted in FIG. 2 may be carried out in one "global" calculation using minimisation methods, some of which come under the general heading of "maximum likelihood estimation" (as introduced by R A Fisher in 1921). When applied to the signals received in a terminal of a communications network, maximum likelihood estimation finds parameter estimates that maximise the likelihood of receiving the signals as observed, given a specific model of the signals received at the terminal.

Figure 1:
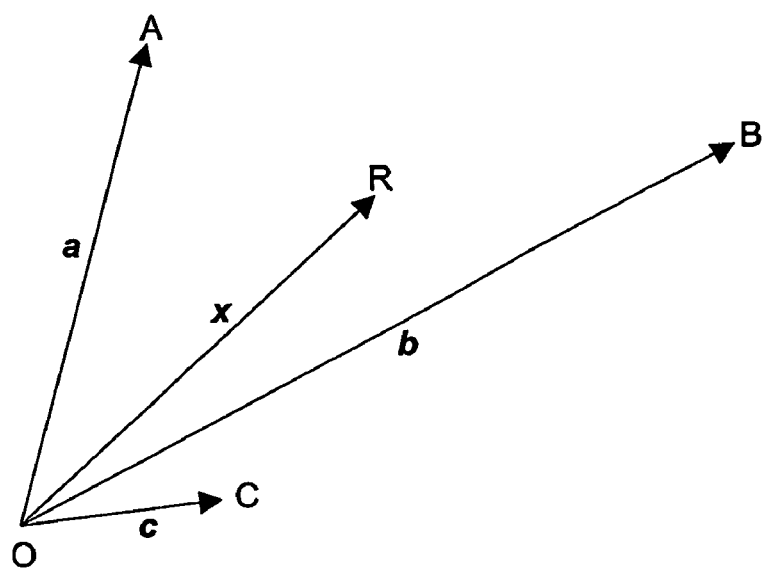
FIG. 1 shows the geometry of a two-dimensional communications system in which all the transmitters and the mobile terminal lie in one plane.

For a system as shown in FIGS. 1 and 2, it is known that there are three components within the total signal recorded by the mobile terminal, corresponding to the transmissions from the three transmitters A or 201, B or 202 and C or 203. In the absence of multipath, noise and non-linear effects, the representation of the received signal may be denoted by V(t) as below:

$$V(t)=\alpha S_A(t-\Delta t_A)+\beta S_B(t-\Delta t_B)+\gamma S_C(t-\Delta t_C),$$

Here, there are six unknown parameters: $\alpha$, $\beta$, $\gamma$, and $\Delta t_A$, $\Delta t_B$, $\Delta t_C$: $\alpha$, $\beta$, $\gamma$ are complex constants representing the path losses to the terminal from the respective transmitters and $\Delta t_A$, $\Delta t_B$, $\Delta t_C$ are time offsets. These parameters are given initial values, $\alpha_1$, $\beta_1$, $\gamma_1$, and $\Delta t_{A1}$, $\Delta t_{B1}$, $\Delta t_{C1}$, say unity for each of $\alpha_1$, $\beta_1$, $\gamma_1$ and zero for $\Delta t_{A1}$, $\Delta t_{B1}$, $\Delta t_{C1}$. A composite model signal, $V_1(t)$, is then constructed using the recordings made at each of the transmitters and these initial values thus:

$$V_1(t)=\alpha_1 S_A(t-\Delta t_{A1})+\beta_1 S_B(t-\Delta t_{B1})+\gamma_1 S_C(t-\Delta t_{C1}).$$

The values of $V_1(t)$ are calculated at each of the sample times corresponding to the sample times of the representation of the received signal, and $V_1(t)$ is subtracted from $V(t)$ to produce a residual $R(t)$:

$$R(t)=V(t)-V_1(t),$$

which is a time series of complex values. The minimisation calculation now proceeds in a stepwise fashion in the nine parameter space, adjusting at each step the current values of $\alpha_1$, $\beta_1$, $\gamma_1$ (complex values), and $\Delta t_{A1}$, $\Delta t_{B1}$, $\Delta t_{C1}$ in such a direction as to reduce the value of $\Sigma R^2(t)$, where the summation is taken over all the samples. If the values of these nine parameters were correct, in the absence of multipath, noise and non-linear effects, $\Sigma R^2(t)$ would be zero. In practice the solution minimising $\Sigma R^2(t)$ is sought.

There are many methods of finding the minimum in this case, including the methods of conjugate gradients, simplex, and Levenburg-Marquardt (see for example chapter 10 "Minimization or Maximization of Functions", of Numerical Recipes in C, William H. Press et al, Cambridge University Press, 1992). The method of conjugate gradients, for example, is as follows. The set of parameters describing the model can be represented by {P} where the curly braces indicate a range of parameters, e.g. $\alpha_1$, $\beta_1$, $\gamma_1$, $\Delta t_{A1}$, $\Delta t_{B1}$, $\Delta t_{C1}$ in the present case. Initial values are chosen for each of these parameters, thus identifying a point in the multi-dimensional parameter space at which to begin the minimisation procedure. The value to be minimised, $\Sigma R^2(t)$, takes a particular value at this point which in general is larger than its minimum value. The gradient with respect to each of the parameters in turn is now calculated, represented by $\nabla (\Sigma R^2(t))$, and this is a vector whose direction is along the 'downhill slope'. Movement in this direction reduces the value of $\Sigma R^2(t)$. In general, this is not towards the minimum value. For example in the two-dimensional case, the 'shape' (in three dimensions) of $\Sigma R^2(t)$ may be like a long valley the starting point may be on one side and some way along the valley from its lowest point. The gradient, $\nabla (\Sigma R^2(t))$, then points towards the floor of the valley, but once there it is necessary to turn roughly at right angles in order to proceed along the valley floor towards the lowest point. Hence in the method of conjugate gradients, the minimum value is sought by moving 'downhill' in the direction of the gradient $\nabla (\Sigma R^2(t))$, and then the conjugate gradient is selected for the next step, again proceeding until the lowest value of $\Sigma R^2(t)$ has been found in that direction, and so on until no gradient can be found which continues to reduce the value of $\Sigma R^2(t)$. This point is then taken as the overall minimum, and the corresponding values of the parameters {P} as those which are required for the model to best fit the target.

It is also possible to choose a different function to minimise. Here we have chosen the sum of the squares of the residuals at each sample time, and if the errors in the measurements were Gaussian this would correspond with a Maximum Likelihood estimation (see for example, Chapter 15, Section 15.1 "Least Squares as a Maximum Likelihood Estimator", Numerical Recipes in C, William H. Press et al, Cambridge University Press, 1992). Another choice might be to minimise the sum of the absolute values of the residuals. The best choice in practice depends, amongst other things, on the actual distribution of the errors and the complexity of the model.

In practice, the multi-dimensional parameter space may encompass several local minima as well as the true global minimum (which we are seeking). In principle, it is possible to calculate the likelihood at every combination of possible parameter values encompassing the whole parameter space, and to choose the combination corresponding to the lowest value as the minimum. However, such a method may be too slow to be useful since it would involve a great many calculations. Quicker searching methods, such as the method of conjugate gradients explained above, rely on starting with a parameter combination sufficiently close to the global minimum that the search path finds the minimum reliably. The initial set of signal parameters, which represent this starting point, can be chosen as the values calculated using a simple model of the radio propagation between a transmitter and the receiver, for example by assuming free-space propagation. For example, the amplitude E of the signal received at distance r from an omni-directional transmitter of power P may be calculated in free space to be $$E=\sqrt{(P/4\pi r^2)}\exp(j\omega(t-r/c)),$$

where j is the imaginary operator, $\omega$ is the angular frequency, t is the time, and c is the speed of the radio waves. This value may be used as one of the initial set of parameters.

In a communication system having multipath, the maximum likelihood method described may be used to estimate the time offset of more than one copy of the signal received at the terminal from each transmitter. Each additional signal component adds a corresponding set of parameters to be adjusted in the minimisation process, increasing the computation time. The complexity of each channel model may therefore need to be limited in a practical realisation of the method of the invention, for example, limiting the channel model to two or three received signal copies or only to copies received within a particular time period.

The use of maximum likelihood estimation techniques provides a consistent approach to parameter estimation problems and commercially available statistical software packages provide suitable algorithms for many of the commonly observed data distributions.

One of the requirements of the invention is that the recordings of the signals made at A, B, C, and R overlap in time with each other. The recording process in the mobile terminal can be initiated, for example, by the receipt of a particular aspect of the signal transmitted by the serving transmitter (A in the above analysis). The recordings made in the transmitters must all be loosely synchronised with this aspect. Where the transmitters are synchronised with each other, as in the IS95 standard, the aspect will be transmitted at approximately the same time by all transmitters in the network. In unsynchronised systems, however, other means such as GPS clocks or the concepts described in our WO-A-00/73814, EP application no. 01301679.5 and EP application no. 01308508.9 may be used.

As explained earlier, the present invention can also be applied to the fixed receivers (LMUs) of a positioning system using conventional E-OTD techniques. In this case, a fixed receiver is usually co-sited with the transmitter, but is connected to a separate receiving antenna. The LMU, which needs to support a large dynamic range and display exceptionally good linear characteristics, receives the signals picked up by its antenna, creates a section of a representation of the signals and sends the section to a computing device in which the time offset estimates may be calculated as above.

The method of the invention may be used in the process of tracking a moving handset. Periodic sets of time offset estimates may be used to locate a moving terminal and, depending on the apparatus used, quasi-continuous tracking can thereafter be achieved. For example, a set of time offset estimates of at least three geographically-distinct transmitters can be made from which the current location of the terminal can be estimated. The moving handset can then be tracked for a short while using timing measurements derived from the signals from the brightest one or two local transmitters only i.e. without the need to counter the hearability problem for the weaker signals by applying a method of the invention. The handset may therefore be tracked continuously with occasional application of a method of the invention, supplemented by more frequent measurements upon the local transmitters only.

The invention claimed is:

1. A method of estimating the time offsets between signals transmitted by plural transmitters of a communications network and received by a receiver attached to a terminal, the method comprising the steps of
   (a) creating a terminal section of a representation of the signals from the plural transmitters received by the receiver at the terminal;
   (b) creating a first section of a representation of the signal transmitted by a first of said transmitters, and creating a second section of a representation of the signal transmitted by a second of said transmitters, each of which sections overlaps in time with the terminal section;
   (c) using the first section, the second section and a set of signal parameters, including initial estimates of the time offsets between the first section and the terminal section and between the second section and the terminal section, to create a model of a section of a representation of the composite signal received by the receiver from the first and second transmitters;
   (d) comparing the model with the terminal section;
   (e) refining the set of signal parameters including the time offset estimates to minimise the difference between said model and the terminal section; and
   (f) adopting the time offsets in the refined parameter set used to minimise the difference between said model and the terminal section, as the estimated time offsets between the first section and the terminal section and between the second section and the terminal section.

2. A method according to claim 1, wherein the first section, the second section, and the terminal section are created by sampling the respective signals at sample times according to a predetermined sampling rate.

3. A method according to claim 2, wherein at least the first section is scaled by a first initial complex amplitude value and delayed by a first initial time delay and the second section is scaled by a second initial complex amplitude value and delayed by a second initial time delay, whereafter the scaled and delayed first and a second sections are used to build an adjustable representation or model of the combined signal from the first and second transmitters received by the receiver, the model of the combined signal from the first and second transmitters received by the receiver is subtracted from the terminal section to produce a time series containing the complex difference at each sample time, and wherein the squares of the amplitudes of the complex difference at each sample time are added to produce a single real value representative of the overall difference between the model and the target signal or set of signals.

4. A method according to claim 3, wherein the model comprises three, four or more scaled and delayed transmitter sections.

5. A method according to claim 1, wherein the first and second sections are created at the respective first and second transmitters.

6. A method according to claim 1, wherein the first and second sections are created in one or more sampling devices attached to the respective transmitters.

7. A method according to claim 1, wherein the first and second sections are created by computer programs using information supplied from the network about the transmitted signals.

8. A method according to claim 1, wherein the signal representation sections are sent to one or more computing devices in which said estimates are calculated.

9. A method according to claim 8, wherein the terminal location is calculated in said one or more computing devices.

10. A method according to claim 8, wherein the one or more computing devices are in the or another terminal.

11. A method according to claim 1, wherein the terminal section of the representation of the signals received by the receiver at the terminal is recorded in the terminal before being sent to a computing device.

12. A method according to claim 1, wherein the terminal section of the representation of the signals received by the receiver at the terminal is transferred in real time to the computing device and a recording made there.

13. A method according to claim 1, further comprising the step of calculating the position of a mobile terminal in a communication network using the estimated time offsets.

14. A method according to claim 1, further comprising the step of tracking a moving mobile terminal in a communications network by periodically estimating and using the estimated time offsets.

15. Apparatus for estimating the time offsets between signals transmitted by plural transmitters of a communications network and received by a receiver attached to a terminal, the apparatus comprising
   (a) processing means arranged to create a terminal section of a representation of the signals from the plural transmitters received by the receiver at the terminal;

(b) processing means arranged to create a first section of a representation of the signal transmitted by a first of said transmitters, and to create a second section of a representation of the signal transmitted by a second of said transmitters, each of which sections overlaps in time with the terminal section;

(c) processing means arranged to create a model of a section of a representation of the composite signal received by the receiver from the first and second transmitters using the first section, the second section and a set of signal parameters, including initial estimates of the time offsets between the first section and the terminal section and between the second section and the terminal section;

(d) processing means arranged to compare the model with the terminal section;

(e) processing means arranged to refine the set of signal parameters including the time offset estimates to minimise the difference between said model and the terminal section; and (f) processing means arranged to adopt the time offsets in the refined parameter set used to minimise the difference between said model and the terminal section, as the estimated time offsets between the first section and the terminal section and between the second section and the terminal section.

16. Apparatus according to claim 15, which includes a sampling device or devices in which the first section, the second section, and the terminal section are created by sampling the respective signals at sample times according to a predetermined sampling rate.

17. Apparatus according to claim 15, wherein at least the first section is scaled by a first initial complex amplitude value and delayed by a first initial time delay and the second section is scaled by a second initial complex amplitude value and delayed by a second initial time delay, whereafter the scaled and delayed first and a second sections are used to build an adjustable representation or model of the combined signal from the first and second transmitters received by the receiver, the model of the combined signal from the first and second transmitters received by the receiver is subtracted from the terminal section to produce a time series containing the complex difference at each sample time, and wherein the squares of the amplitudes of the complex difference at each sample time are added to produce a single real value representative of the overall difference between the initial model and the target signal or set of signals.

18. A telecommunications terminal including apparatus for finding the time offsets between signals transmitted by a plurality of transmitters of a communications network and received by a receiver attached to the terminal, the apparatus comprising (a) processing means arranged to create a terminal section of a representation of the signals from plural transmitters received by the receiver at the terminal;

(b) processing means for receiving a first section of a representation of the signal transmitted by a first of said transmitters and a second section of a representation of the signal transmitted by a second of said transmitters, each of which sections overlaps in time with the terminal section;

(c) processing means arranged to create a model of a section of a representation of the composite signal received by the receiver from the first and second transmitters using the first section, the second section and a set of signal parameters, including initial estimates of the time offsets between the first section and the terminal section and between the second section and the terminal section;

(d) processing means arranged to compare the model with the terminal section;

(e) processing means arranged to refine the set of signal parameters including the time offset estimates to minimise the difference between said model and the terminal section; and (f) processing means arranged to adopt the time offsets in the refined parameter set used to minimise the difference between said model and the terminal section, as the estimated time offsets between the first section and the terminal section and between the second section and the terminal section.

19. A communications network for finding the time offsets between signals transmitted by a plurality of transmitters of the communications network and received by a receiver attached to a terminal, the network comprising (a) a computing device or devices;

(b) a terminal having a receiver attached to the terminal, processing means arranged to create a terminal section of a representation of the signals from plural transmitters received by the receiver at the terminal, and means for sending the section to the computing device or devices;

(c) sampling devices associated with respective first and second ones of said transmitters for creating respective first and second sections of representations of the signals transmitted by a first and a second of said transmitters, each of which sections overlaps in time with the terminal section, and for sending the sections of representations to the computing device or devices;

the computing device or devices being adapted to create a model of a section of a representation of the composite signal received by the receiver from the first and second transmitters using the first section, the second section and a set of signal parameters, including initial estimates of the time offsets between the first section and the terminal section and between the second section and the terminal section;

compare the model with the terminal section;

refine the set of signal parameters including the time offset estimates to minimise the difference between said model and the terminal section; and adopt the time offsets in the refined parameter set, used to minimise the difference between said model and the terminal section, as the estimated time offsets between the first section and the terminal section and between the second section and the terminal section.

20. A computing device or devices for use in a communications network according to claim 18, the computing device being adapted to create a model of a section of a representation of the composite signal received by the receiver from the first and second transmitters using the first section, the second section and a set of signal parameters, including initial estimates of the time offsets between the first section and the terminal section and between the second section and the terminal section;

compare the model with the terminal section;

refine the set of signal parameters including the time offset estimates to minimize the difference between said model and the terminal section; and adopt the time offsets in the refined parameter set, used to minimize the difference between said model and the terminal section, as the estimated time offsets between the first section and the terminal section and between the second section and the terminal section.

21. A program code embodied on a computer-readable medium adapted to
create a terminal section of a representation of the signals from plural transmitters received by the receiver at the terminal;
process a first section of a representation of the signal transmitted by a first of said transmitters and a second section of a representation of the signal transmitted by a second of said transmitters, each of which sections overlaps in time with the terminal section;
create a model of a section of a representation of the composite signal received by the receiver from the first and second transmitters using the first section, the second section and a set of signal parameters, including initial estimates of the time offsets between the first section and the terminal section and between the second section and the terminal section;
compare the model with the terminal section;
refine the set of signal parameters including the time offset estimates to minimize the difference between said model and the terminal section; and
adopt the time offsets in the refined parameter set, used to minimize the difference between said model and the terminal section, as the estimated time offsets between the first section and the terminal section and between the second section and the terminal section.

* * * * *